United States Patent [19]
Jiang et al.

[11] Patent Number: 5,846,417
[45] Date of Patent: Dec. 8, 1998

[54] SELF CLOSING FILTER CENTERPOST

[75] Inventors: Zemin Jiang, Cookeville; Charles Hawkins, Spata, both of Tenn.

[73] Assignee: Fleetguard, Inc., Nashville, Tenn.

[21] Appl. No.: 897,334

[22] Filed: Jul. 21, 1997

[51] Int. Cl.$^6$ .......................... B01D 35/153; B01D 27/10
[52] U.S. Cl. .......................... 210/235; 210/438; 210/440; 210/457
[58] Field of Search .................................... 210/235, 457, 210/438, 440; 137/543.23

[56] References Cited

U.S. PATENT DOCUMENTS

| | | |
|---|---|---|
| 2,473,727 | 6/1949 | Robertson . |
| 2,793,752 | 5/1957 | Jay . |
| 2,894,630 | 7/1959 | Humbert . |
| 3,056,503 | 10/1962 | Roosa . |
| 3,300,050 | 1/1967 | Perry . |
| 3,317,048 | 5/1967 | Kasten . |
| 3,319,791 | 5/1967 | Horne . |
| 3,327,858 | 6/1967 | Eddy et al. . |
| 3,473,666 | 10/1969 | Humbert, Jr. . |
| 3,726,262 | 4/1973 | Moon . |
| 3,852,196 | 12/1974 | Szpur . |
| 3,912,630 | 10/1975 | Reighard et al. . |
| 4,298,465 | 11/1981 | Druffel . |
| 4,321,136 | 3/1982 | Matsui . |
| 4,367,144 | 1/1983 | Peters et al. . |
| 4,387,691 | 6/1983 | Marcoux et al. . |
| 4,406,785 | 9/1983 | Siefer . |
| 4,437,986 | 3/1984 | Hutchins et al. . |
| 4,477,345 | 10/1984 | Szlaga, Jr. . |
| 4,502,955 | 3/1985 | Schaupp . |
| 4,580,542 | 4/1986 | Kawabata . |
| 4,596,224 | 6/1986 | Prager et al. . |
| 4,608,161 | 8/1986 | Niemeier . |
| 4,997,555 | 3/1991 | Church et al. . |
| 5,049,269 | 9/1991 | Shah . |
| 5,122,264 | 6/1992 | Mohr et al. . |
| 5,215,655 | 6/1993 | Mittermaier . |
| 5,242,581 | 9/1993 | Mohr . |
| 5,244,571 | 9/1993 | Church et al. . |
| 5,256,285 | 10/1993 | Tomita et al. . |
| 5,458,767 | 10/1995 | Stone . |

*Primary Examiner*—Thomas M. Lithgow
*Attorney, Agent, or Firm*—Woodard, Emhardt, Naughton, Moriarty & McNett

[57] ABSTRACT

A self-closing centerpost for a fluid filter includes a centerpost body which is constructed and arranged with a hollow interior so as to provide a fluid passageway. The fluid filter is designed for fuel and the hollow centerpost body includes an outer wall which defines a pair of flow apertures. These flow apertures are in flow communication with the fluid passageway in order to deliver fluid to the outlet port of the fluid filter. A control valve is positioned within the hollow interior and is designed with a pair of oppositely-disposed blocking portions which are disposed over the flow apertures when the flow control valve is in its normally closed (spring-biased) condition. In this closed condition, fuel is unable to enter the hollow centerpost body and is thus unable to be delivered to the engine. A biasing spring maintains the flow control valve in this closed condition until such time as a filtering element is installed at which point the endplate of the filtering element is used as the means to push down on a plunger portion of the flow control valve. Once the spring biasing force is exceeded by downward movement of the control valve, the blocking portions move away from the flow apertures so as to move the flow control valve into an open condition and permit fuel to flow through the flow apertures.

13 Claims, 7 Drawing Sheets

SELF CLOSING FILTER CENTERPOST

BACKGROUND OF THE INVENTION

The present invention relates in general to fluid filters which utilize a centertube or centerpost as part of the designed fluid flow path. More specifically the present invention relates to the design of a centerpost for a fluid filter which is designed with a spring-biased valve in order to control the flow through the centerpost. When a cooperating filtering element is installed, the spring-biased valve is moved to an open condition in order to permit fluid flow into and through the centerpost. When there is no filtering element present, the spring-biased valve is spring-biased to a closed condition such that fluid flow through the centerpost does not occur.

In the design of certain fluid filters, a centertube or centerpost is used as a means to route the filtered fluid to an exit port or aperture. The specific fluid routing path depends on the style and type of filter and a variety of flow paths are found in earlier designs. In a number of these earlier designs, the centerpost is configured with a hollow interior and flow openings through the sidewall of the centerpost in order for fluid to enter and flow through the hollow interior. In these designs, an exit location or aperture is typically provided such that the fluid which is flowing through the hollow interior of the centerpost is able to exit the centerpost and thereafter exit the fluid filter in order to be utilized by the vehicle engine.

In the design of fuel filters, the hollow centerpost typically includes a pair of oppositely-disposed flow openings at an upper end of the centerpost and an exit aperture is disposed at the lower end of the centerpost which in turn communicates with an exit port leading from the filter assembly. So long as these flow openings in the centerpost remain open, the filtered fluid (fuel) is able to automatically flow into these openings after passing through the filtering element and from there, flow to the exit aperture or port.

In the event the filtering element is removed from the fluid filter assembly, any fluid (fuel) circulating through the filter housing would not be of the desired quality and character since it would not be filtered prior to being delivered to the engine. Accordingly, there is a concern that the vehicle engine which utilizes the fuel may be damaged or, at a minimum, have poor performance. While the filtering element may be removed from the filter housing for any number of reasons, the objective of the present invention is to prevent the operation of the vehicle if the fuel filtering element is not installed. Obviously when the fluid to be filtered is fuel, then merely blocking the flow of fuel by closing the centerpost will effectively prevent the vehicle engine from operating. Consequently, it would be an improvement to existing fuel filter designs if the presence (or absence) of the filtering element can be used to control the status of the centerpost such that the centerpost is open and fuel is able to flow through the centerpost when the filtering element is present and effectively closing the centerpost so as to block any fuel flow when the filtering element is removed. The present invention provides such an improvement in a novel and unobvious manner.

SUMMARY OF THE INVENTION

A self-closing centerpost for a fluid filter according to one embodiment of the present invention comprises a centerpost constructed and arranged with a hollow interior which provides a fluid passageway, the centerpost including an outer wall defining a flow aperture therethrough, the flow aperture being in flow communication with the fluid passageway, a flow control valve positioned within the hollow interior, the flow control valve including a blocking portion disposed over the flow aperture so as to block the flow therethrough when the flow control valve is in a closed condition and a biasing spring positioned within the hollow interior of the centerpost and acting on the flow control valve in order to keep the flow control valve in a normally closed condition relative to the centerpost, the flow control valve including a plunger which is operable, when depressed into the hollow interior of the centerpost, to overcome the biasing spring and move the blocking portion of the flow control valve away from the flow aperture so as to place the flow control valve in an open condition and permit flow through the flow aperture.

One object of the present invention is to provide an improved self-closing centerpost for a fluid filter.

Related objects and advantages of the present invention will be apparent from the following description.

DESCRIPTION OF THE PREFERRED EMBODIMENT

Figure 1:
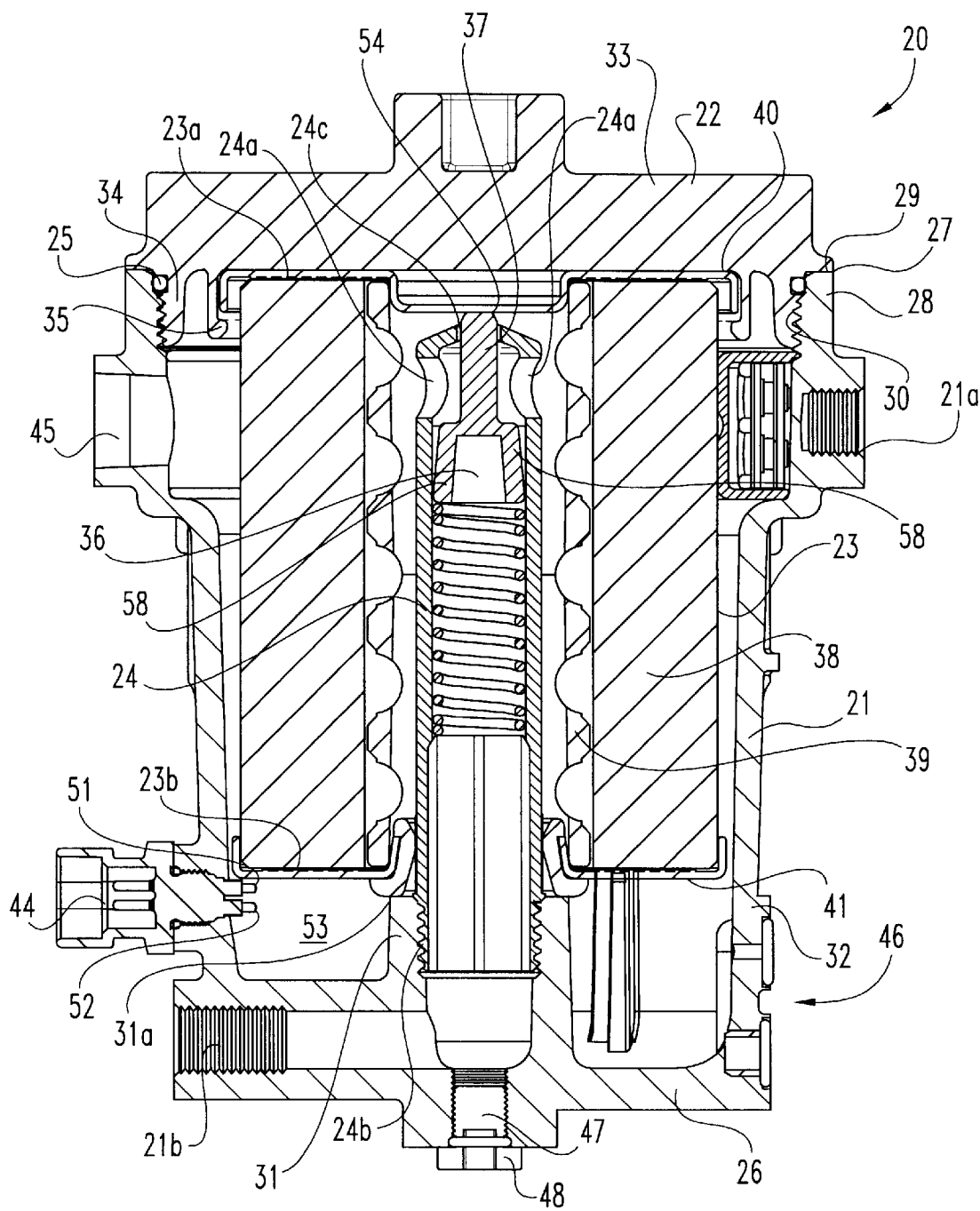
FIG. 1 is a front elevational view in full section of a fuel filter including a self-closing centerpost according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a fluid filter assembly 20 which is designed as a fuel filter with a water-in-fuel (WIF) sensor and water separation capability. Fluid filter assembly 20 includes an outer housing 21, closing lid 22, replaceable filter cartridge 23, centerpost 24, and O-ring 25. While the actual outer housing 21, closing lid 22, and filter cartridge 23 may typically include a number of structural features and cooperating components, for the most part these have been omitted for two reasons. First, the present invention does not relate directly to these structural features and components. Secondly, several of the structural features and components have been omitted for drawing clarity. It is easier to see and visualize the features of the present invention if these other structural features and components, associated with the outer housing 21, closing lid 22, and filter cartridge 23, are omitted.

The outer housing is internally threaded at its open end and the closing lid is externally threaded so as to threadedly engage with the outer housing in order to close the open end of the outer housing. As this threaded engagement occurs, O-ring 25 is compressed between the closing lid 22 and outer housing 21 so as to establish a liquid-tight interface at that location. A plurality of snap-on fingers are provided as part of the closing lid. As will be described, the fingers of the lid are effective to snap over and around the outer wall and lower edge of the enlarged endplate on the upper end of the filter element so as to enable installation and removal of the replaceable filter cartridge by handling the lid and without having to handle the filter cartridge.

The molded outer housing 21 is a unitary member which is closed at its base or bottom end 26 and is open at its opposite, upper end 27. An inlet fitting 21a is formed as part of housing 21 adjacent to upper end 27. Fitting 21a is internally threaded for receipt of a cooperating fluid connection. An outlet fitting 21b is formed as part of housing 21 adjacent bottom end 26. Fitting 21b is internally threaded for receipt of a cooperating fluid connection. The flow path through fluid filter assembly 20 begins at inlet fitting 21a, passes through filter cartridge 23 from the outside inwardly, and flows into the interior of centerpost 24 by way of openings 24a, if those openings are not blocked. The hollow interior of the centerpost 24 is in flow communication with outlet fitting 21b. Upper end 27 includes an outer annular wall 28 formed with a horizontal shelf 29 and a series of internal threads 30 positioned directly below shelf 29. The focus of the present invention is the design and use of a spring-biased flow-control valve 36 which is positioned within and movable relative to the hollow interior of the centerpost. The details of the flow-control valve 36 will be described later.

The base or bottom end 26 is molded with a raised, substantially cylindrical stem 31 which is internally threaded and extends up into the hollow interior of the outer housing 21. Stem 31 is substantially concentric with the annular wall 32 of the outer housing and substantially concentric with lid 22 and cartridge 23. Centerpost 24 is a substantially cylindrical, substantially straight tubular member which is externally threaded at end 24b and closed at the opposite end adjacent openings 24a except for a small centered opening 24c which receives the plunger 37 of control valve 36. As will be described hereinafter, centertube 24 has an upper portion with a first outside diameter size and a lower portion closer to the external threads with a slightly larger diameter portion. The difference in outside diameter size between these two portions is provided in order to facilitate the slide-on assembly of the filter cartridge 23.

As the filtered fluid passes through the filter cartridge from the outside inwardly, the only exit path is to flow into openings 24a, if the control valve 36 is positioned so as to not block openings 24a. From there, the filtered fluid flows through the centerpost 24 and exits by way of outlet fitting 21b. In order to help establish the described flow path, the upper end 23a of cartridge 23 is closed and the lower end 23b is configured so as to seal radially against and around the outside diameter of centerpost 24 and to seal axially against the upper end 31a of stem 31.

The molded closing lid 22 is an annular, unitary member which includes an upper body portion 33, an externally threaded outer annular wall 34 depending from upper body portion 33 and an inner series of snap-over fingers 35 depending from the underside of upper body portion 33. A total of eight fingers 35 are integrally molded as part of lid 22 and are equally spaced in a circumferential array in the shape of an annular wall which is substantially concentric to outer annular wall 34. The eight fingers 35 all extend in an axial direction.

The replaceable filter cartridge 23 is a hollow, substantially cylindrical assembly which includes a substantially cylindrical filter element 38, a substantially cylindrical inner liner 39, and a pair of annular endplates 40 and 41. A layer of adhesive such as a polyurethane potting compound or plastisol is used to securely bond each endplate 40 and 41 to the subassembly of the filter element 38 and the inner liner 39.

Also included as part of filter assembly 20 is a water-in-fuel (WIF) sensor 44, a port 45 for a heater connector/thermostat assembly, a connection location 46 for a drain valve, and a downstream diagnostic port 47 which is closed by threaded plug 48. The WIF sensor 44 includes two contacts 51 and 52 which extend into collection space 53. As water gradually collects in space 53, it will displace the fuel. Over time, the volume of water increases to the point that the water level comes in contact with contacts 51 and 52, thereby providing an indication of conductivity which is sensed and monitored. An electrical signal is generated which advises the vehicle operator that it is time to drain the collection space 53 of water by means of the drain valve which will be connected at connection location 46. Additional details of a fuel filter of the type illustrated in FIG. 1 are provided in U.S. patent application Ser. No. 08/742,631, which application was filed Nov. 1, 1996, and which pending application is expressly incorporated by reference herein.

Figure 2:
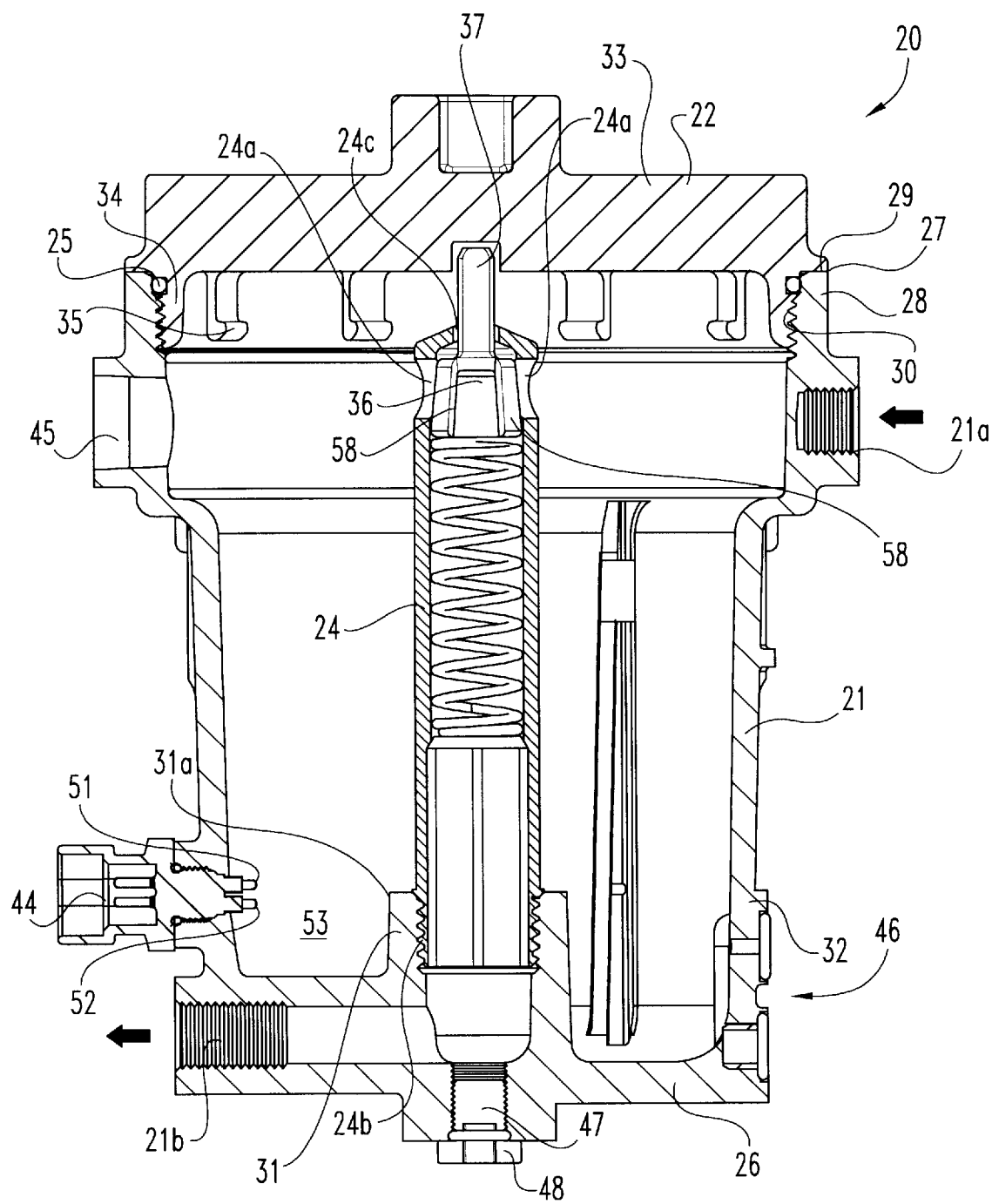
FIG. 2 is a front elevational view in full section of the FIG. 1 filter with the filtering element removed.

In the FIG. 1 illustration, a flow-control valve 36 has been included and positioned in the hollow interior of the centerpost 24. In the FIG. 1 arrangement, plunger 37 which extends upwardly through opening 24c is pushed back down into the centerpost by the upper endplate 40. The upper endplate 40 is constructed and arranged with an offset portion 54 which has an annular shape so as to fit down inside of the inner liner 39 of the replaceable filter cartridge 23. It is the lower surface 55 of this offset portion 54 which contacts the extended and spring-biased plunger 37 of valve 36 as the filter cartridge is installed. If there is no filter cartridge (i.e., filtering element) installed into the outer housing 21, then there is nothing present which will be able to compress (or depress) the extended plunger. This arrangement (the absence of a filter cartridge) is illustrated in FIG. 2.

Since it is important for diesel fuel to be filtered before being used by the vehicle's engine, if the filter cartridge (filtering element) is not present, the vehicle should not be operated. One way to prevent vehicle operation is to cut off the fuel supply. Focusing on these objectives, the present invention was conceived. The control valve 36 is designed so as to be in the condition of FIG. 2 when a filter cartridge is not installed. This is the normally closed, spring-biased condition for control valve 36 and would be the normal condition of the filter whenever the filtering element or filter cartridge is removed. In this spring-biased, closed condition, the blocking portions 58 which are integral with plunger 37 are positioned in a blocking manner across the two, oppositely-disposed openings 24a, so that any incoming fuel is unable to flow into the hollow interior of centerpost 24. Accordingly, since the incoming fuel is unable to enter the hollow interior, the fuel is unable to flow out of fitting 21b so that the fuel can be used by the vehicle's engine. Consequently, the vehicle will not operate.

Figure 3:
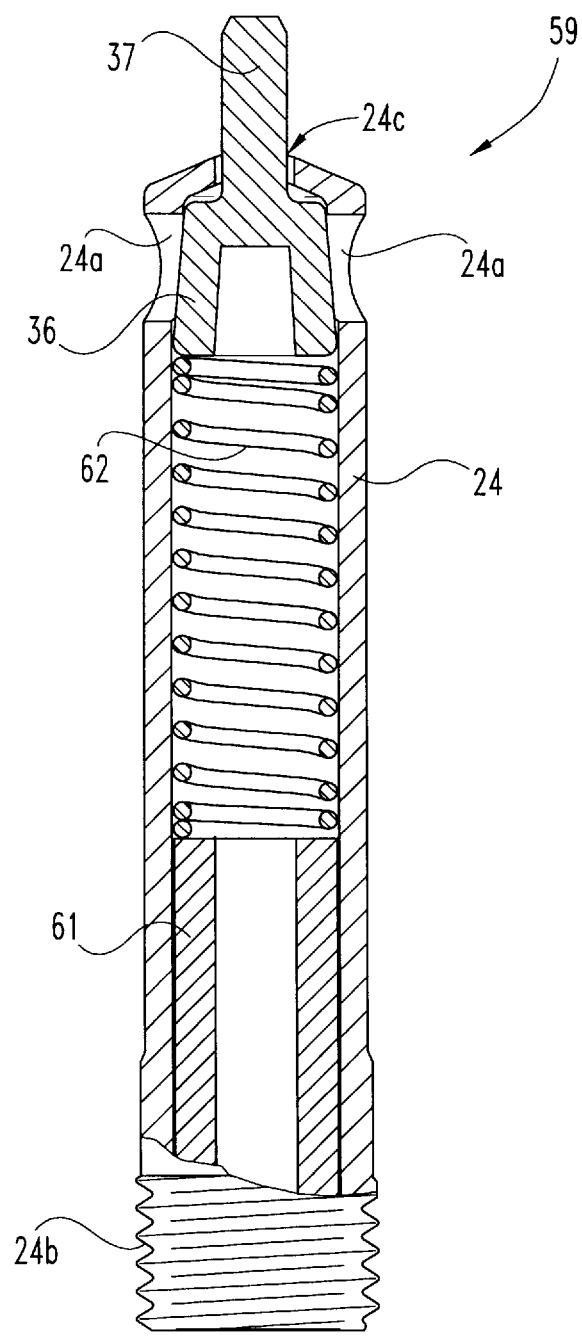
FIG. 3 is a front elevational view in full section of one embodiment of the self-closing centerpost of the present invention in a closed condition.
Figure 4:
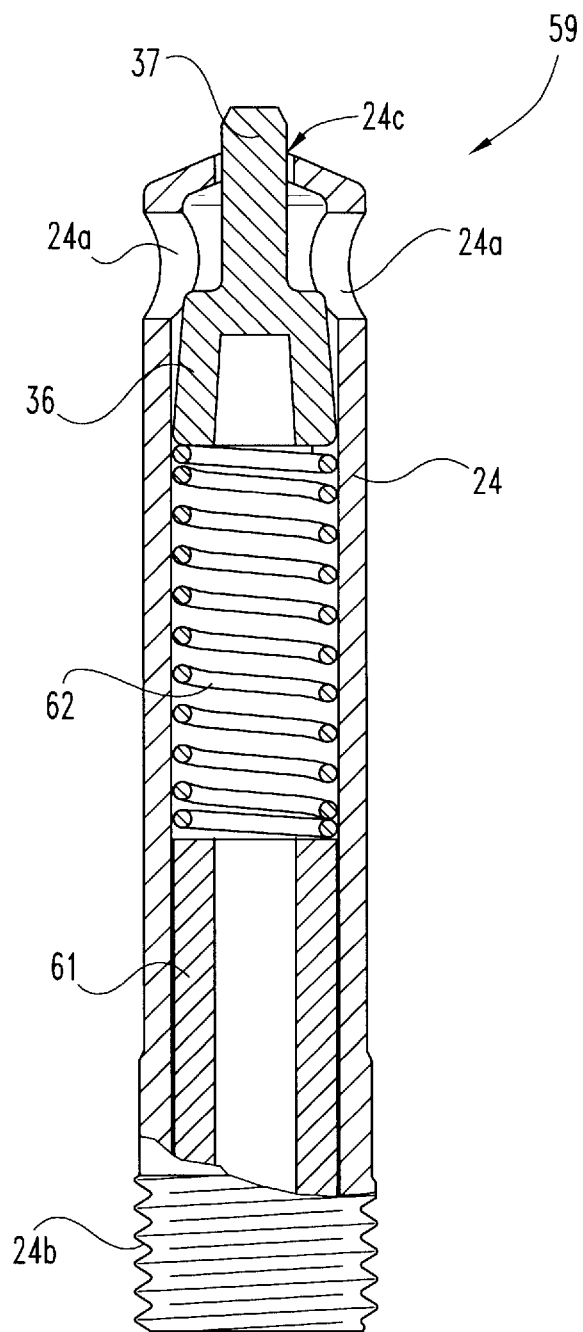
FIG. 4 is a front elevational view in full section of the FIG. 3 self-closing centerpost in an open condition.
Figure 5:
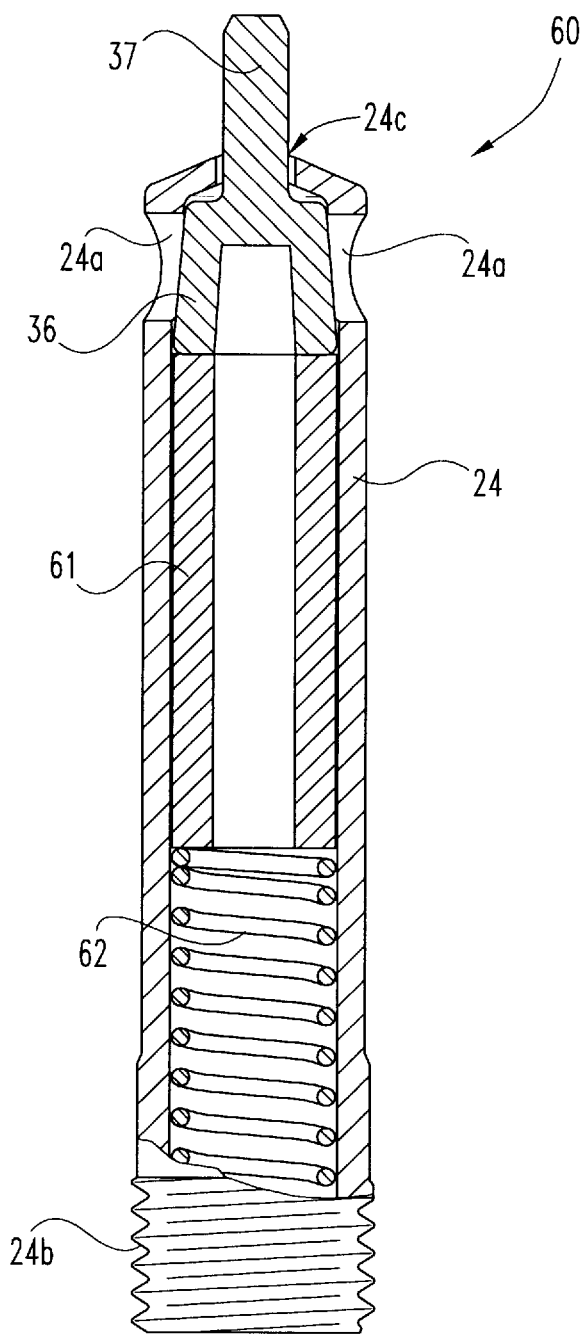
FIG. 5 is a front elevational view in full section of an alternative embodiment of the present invention showing the self-closing centerpost in a closed condition.
Figure 6:
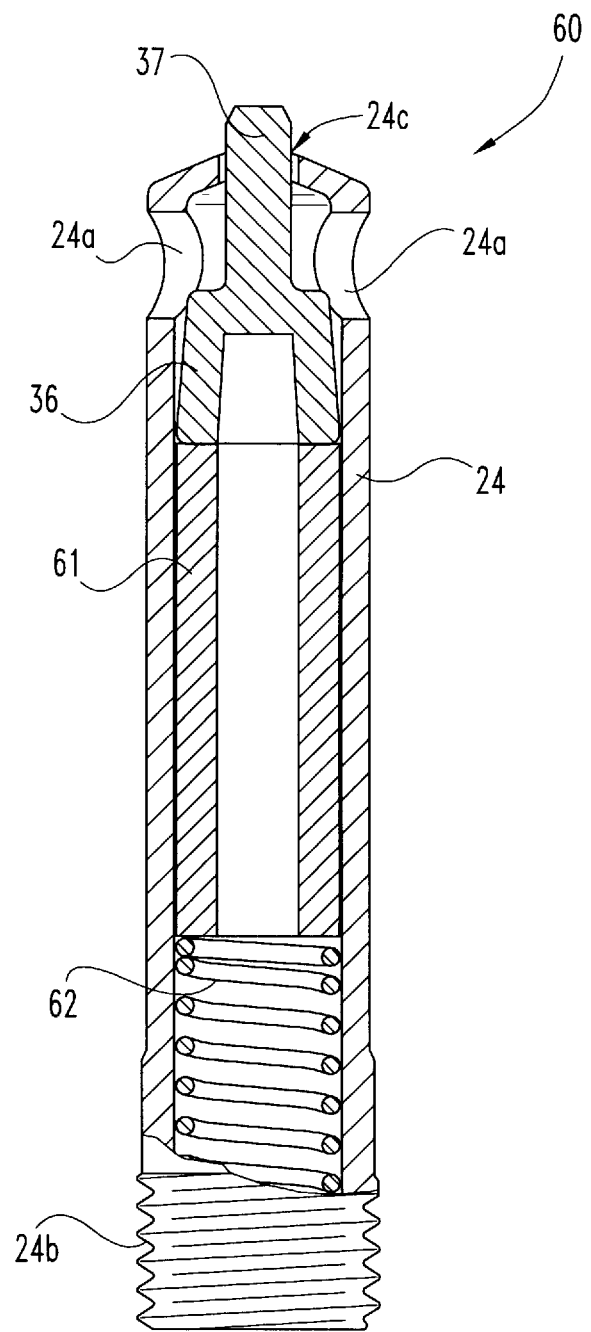
FIG. 6 is a front elevational view in full section of the FIG. 5 self-closing centerpost in an open condition.

With reference to FIGS. 3–6, two different flow-control valve arrangements 59 and 60 are illustrated and each arrangement is illustrated in a flow-open condition as well as in a flow-blocked condition. Each arrangement 59 and 60 includes the same control valve 36 as well as a generally cylindrical and hollow sleeve 61 and a generally cylindrical and hollow spring 62. In the FIGS. 3 and 4 illustrations, the spring 62 is positioned between the control valve 36 and the sleeve 61. In the FIGS. 5 and 6 illustrations, the sleeve 61 is positioned between the control valve 36 and spring 62.

The value of sleeve 61 is to be able to standardize the design of the control valve 36 and spring 62 and then simply vary the length of sleeve 61 depending on the axial length of the hollow interior of the centerpost 24. The depth or degree of offset of portion 54 is also a consideration in establishing a secure blocking condition which will be released and will only be released once the filter cartridge is installed. The overall axial dimensions involving the spring 62, the sleeve 61, the control valve 36, the length of plunger 37, and the depth of offset portion 54 must be coordinated so that there is a sufficient spring tension pushing the blocking portions against the inside edges of the two flow openings 24*a* so that when a filtering element is not present, fuel does not enter the hollow interior of the centerpost. Similarly, it is important for the plunger 37 to extend upwardly so that when a filter is installed, the plunger will be acted upon by the offset portion 54 and will be able to not only overcome the force of the spring, but also actually move the control valve 36 a sufficient distance below and away from the flow opening 24*a* so that fuel, in sufficient quantity, is able to flow through those openings, through the hollow interior of the centerpost 24, and onto the engine.

Figure 7:
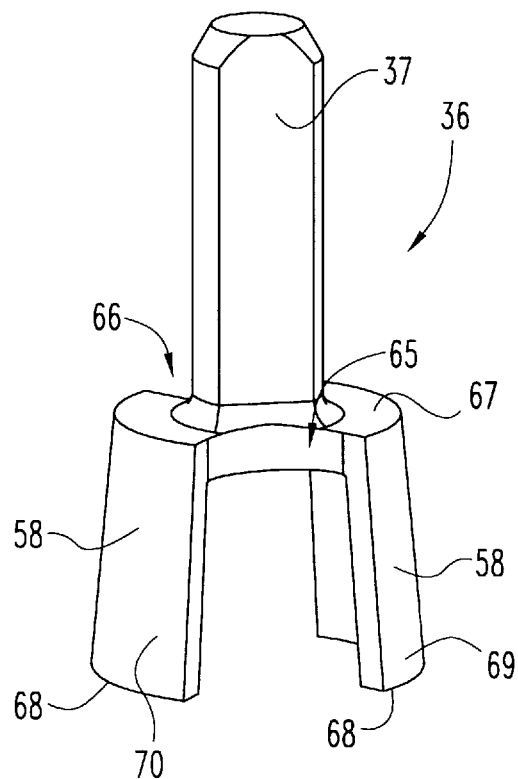
FIG. 7 is a perspective view of a flow control valve according to the present invention.

With reference to FIG. 7, a perspective view of flow-control valve 36 is illustrated. Valve 36 is a unitary member which includes plunger 37, two blocking portions 58, two relief openings 65 and 66, upper surface 67, and lower edges 68. The curved outer surfaces 69 and 70 of the two blocking portions 58 have a slight taper converging in the direction from the lower edge 68 to the upper surface 67. This slight taper to the curved outer surfaces 69 and 70 is helpful in order for the two blocking portions 58 to more closely match the inside surface geometry of the centerpost in and around the area of the flow openings 24*a*. The lower edges 68, if connected by an imaginary curved line, yield a diameter size which closely matches the inside diameter size of the centerpost 24 so that the valve is able to axially move up and down inside of the centerpost in a smooth and aligned fashion as the plunger 37 is pushed down by the filtering element 38 or pushed up by the biasing spring 62.

When the plunger 37 is pushed down, the blocking portions 58 axially move below the openings 24*a*, allowing fuel to enter. The fuel flows across upper surface 67 and flows down through relief openings 65 and 66 into the hollow interior of centerpost 24. The open nature of spring 62 and the hollow, open nature of cylindrical sleeve 61 enable the entering fuel to flow to outlet fitting 21*b*. At any time the downward pressure on plunger 37 is removed, typically by removal of the filtering element 38, the biasing spring 62 returns the control valve 36 to its blocking condition against flow openings 24*a*. In this way, if the fuel is not filtered, it will not be delivered to the engine of the vehicle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A self-closing centerpost for a fluid filter comprising:

a centerpost body constructed and arranged with a hollow interior which provides a fluid passageway, said centerpost body including an outer wall defining a flow aperture therethrough, the flow aperture being in flow communication with said fluid passageway;

a flow control valve positioned within said hollow interior, said flow control valve including a blocking portion disposed over said flow aperture so as to block the flow therethrough when the flow control valve is in a closed condition; and a biasing spring positioned within said hollow interior, the biasing spring acting to keep said flow control valve in a normally closed condition, said flow control valve including a plunger which extends through an opening in said centerpost body when said flow control valve is in said closed condition, said plunger is operable, when depressed into said hollow interior of said centerpost body, to overcome said biasing spring and move said blocking portion away from said flow aperture so as to place said flow control valve in an open condition and permit flow through said flow aperture.

2. The self-closing centerpost of claim 1 which further includes a sleeve positioned within the hollow interior of the centerpost body and positioned between the flow control valve and the biasing spring.

3. The self-closing centerpost of claim 2 wherein the flow control valve is a unitary member.

4. The self-closing centerpost of claim 3 wherein the flow control valve includes two blocking portions which are separated from each other by open relief areas through which the flow passes when the flow control valve is in said open condition.

5. The self-closing centerpost of claim 4 wherein said centerpost body defines a pair of oppositely-disposed flow apertures.

6. The self-closing centerpost of claim 2 wherein the flow control valve includes two blocking portions which are separated from each other by open relief areas through which the flow passes when the flow control valve is in said open condition.

7. The self-closing centerpost of claim 2 wherein said centerpost body defines a pair of oppositely-disposed flow apertures.

8. The self-closing centerpost of claim 1 wherein the flow control valve is a unitary member.

9. The self-closing centerpost of claim 1 wherein the flow control valve includes two blocking portions which are separated from each other by open relief areas through which the flow passes when the flow control valve is in said open condition.

10. The self-closing centerpost of claim 1 wherein said centerpost body defines a pair of oppositely-disposed flow apertures.

11. A fluid filter comprising:

an outer filter housing;

a filtering element disposed within said housing;

a closing endcap assembled to said filer housing; and a self-closing centerpost positioned within said filtering element and comprising:

a centerpost body constructed and arranged with a hollow interior which provides a fluid passageway, said centerpost body including an outer wall defining a flow aperture therethrough, the flow aperture being in flow communication with said fluid passageway;

a flow control valve positioned within said hollow interior, said flow control valve including a blocking portion disposed over said flow aperture so as to block the flow therethrough when the flow control valve is in a closed condition; and a biasing spring positioned within said hollow interior, the biasing spring acting to keep said flow control valve in a normally closed condition, said flow control valve including a plunger which extends through an opening in said centerpost body when said flow control valve is in said closed condition, said plunger is operable, when depressed into said hollow interior of said centerpost body, to overcome said biasing spring and move said blocking portion away from said flow aperture so as to place said flow control valve in an open condition and permit flow through said flow aperture.

12. A flow-control centerpost for a fluid filter comprising:

a centerpost body having an upper wall and an integral and surrounding sidewall defining a hollow interior and a sidewall aperture which is in flow communication with the hollow interior;

a movable, flow-control plunger located within said hollow interior and including a blocking portion positioned across said sidewall aperture in order to prevent fluid flow therethrough when said flow control plunger is in a closed condition;

a biasing spring acting against said flow-control plunger to normally maintain said flow-control plunger in said closed condition; and means for moving said blocking portion away from said sidewall aperture in order to permit fluid flow therethrough into said hollow interior, thereby placing said flow-control plunger in an open conditions said upper wall of said centerpost body includes a clearance hole and said flow control plunger includes an upper stem extending through said clearance hole when said flow control plunger is in said closed condition.

13. The flow-control centerpost of claim 12 wherein said upper stem and said biasing spring are positioned on opposite sides of said flow-control plunger such that a force exerted on said stem in the direction of said flow-control plunger causes said biasing spring to compress, permitting movement of said flow-control plunger to said open condition.

* * * * *